United States Patent [19]

Hirabayashi et al.

[11] Patent Number: 4,706,145
[45] Date of Patent: Nov. 10, 1987

[54] ERASING HEAD

[75] Inventors: Yasuyuki Hirabayashi, Chiba; Juro Sugiura, Tokyo, both of Japan

[73] Assignee: TDK Corporation, Tokyo, Japan

[21] Appl. No.: 779,251

[22] Filed: Sep. 23, 1985

[30] Foreign Application Priority Data

Oct. 1, 1984 [JP] Japan .................. 59-147365[U]

[51] Int. Cl.⁴ .................................... G11B 5/127
[52] U.S. Cl. ................................ 360/118; 360/122
[58] Field of Search .................. 360/118, 122, 129

[56] References Cited

U.S. PATENT DOCUMENTS 3,772,471 11/1973 Imai ..................................... 360/118
4,320,427 3/1982 Bogen ................................. 360/122

FOREIGN PATENT DOCUMENTS 58-88802 5/1983 Japan ................................. 360/118

Primary Examiner—S. J. Heinz
Attorney, Agent, or Firm—Wyatt, Gerber, Shoup, Scobey & Badie

[57] ABSTRACT

An erasing head for magnetic recording medium by magnetizing said recording medium with a permanent magnet is improved by a ferrite head body having a slider plane wider than a track to be erased, and, a magnetic metal thin film covering said slider plane. Said magnetic thin film solves the problem caused by undesired natural magnetization of a permanent magnet, so as to improve the erase ratio and S/N ratio, and the use of slider plane wider than that of a track simplifies producing process of the head since no step is provided between the track to be erased and neighboring track, and no polishing process for smoothing said step is required.

5 Claims, 8 Drawing Figures

ERASING HEAD

BACKGROUND OF THE INVENTION

The present invention relates to an erasing head which erases a magnetic record on a magnetic recording medium.

FIG. 7 shows a prior permanent magnetic type erasing head, which has a permanent magnet 3. The width of the magnet 3 is half of the slider plane 2 which contacts with a magnetic medium like magnetic tape which is subject to erasure, so that said magnet 3 contacts with the track which is subject to erasure, and another track of the magnetic tape contacts with the non magnetic plastics housing 1 so that said other track is not erased.

FIG. 8 is another prior erasing head, in which the permanent magnet 3A is mounted in the non-magnetic plastic housing 1A so that one of the poles (N or S) is disposed on the lower (or upper) half of the slider plane 2. Further, the magnetic material with high permeability 4 like permalloy is mounted along the boundary of the tracks to prevent cross erasing.

However, the erasing heads of FIGS. 7 and 8 have the disadvantage that the manufacturing cost is high, because there are many manufacturing steps. In manufacturing the erasing head of FIG. 7 or FIG. 8, the plastics housing 1, and the permanent magnet 3 are molded separately, then, that housing and magnet are adhered to each other. Further, the slider plane 2 must be polished to remove the step between the magnet and the housing plane Further, the high permeability material 4 must be mounted in case of FIG. 8.

In order to solve the above disadvantage, we considered an erasing head which has a permanent magnet material on the whole slider plane, but said permanent magnet material is magnetized only half of its width. However, we found that said type of erasing head has the problem of an undesired natural magnetization of the magnetic material.

Said natural magnetization is a small amount of magnetization which is generated during the manufacturing process of a permanent magnet, and said natural magnetization should be differentiated from the desired magnetization for providing a permanent magnet. Said natural magnetization is generated when a magnetic material is located in a weak magnetic flux at the temperature near the Curie temperature, or when said magnetic material is locally heated by polish process. The natural magnetization is practically not erased even when the material is heated higher than the Curie temperature, and weak magnetization remains. Said natural magnetization occurs not only in ferrite material, but also in a rare-earth magnet.

As mentioned above, a permanent magnet is inherently magnetized not only on the desired portion, but also on the undesired portion. Accordingly, when an erasing head with the double track width having half of its width magnetized is used for erasing a double track magnetic medium, the undesired natural magnetization on the track which is not desired to be erased is also magnetically effected (for instance, S/N ratio is deteriorated). Accordingly, an erasing head with a permanent magnet which has a double track width and is magnetized half of its width has not been practical.

Further, it should be noted that said undesired natural magnetization affects even the track which is subject to erasure. Since the erasing magnetization has the characteristics that the flux decreases along the running direction of a magnetic medium which is subject to erasure, the erasing flux is affected by the undesired natural magnetization on its neighboring track. In particular, the portion where the flux is weak on the erasing track is affected by the undesired natural magnetization. Therefore, the erasing operation on the erasing track is incomplete, and the S/N ratio is deteriorated when a signal is recorded on the erased track.

Another prior art is shown in Japanese patent laid open publication Nos. 80820/80, 42602/84, and the Japanese utility model laid open publication Nos. 151216/75 and 110718/82, in which a non magnetic-film is coated on magnetic pole portion of a permanent magnet However, those publications do not solve the problem of undesired natural magnetization on the neighboring track which is not erased.

SUMMARY OF THE INVENTION

It is an object, therefore, of the present invention to overcome the disadvantages and limitations of a prior erasing head by providing a new and improved erasing head.

It is also an object of the present invention to provide an erasing head which solves the undesired natural magnetization, and provides the complete erasure with the excellent S/N ratio and the excellent erase ratio.

The above and other objects are attained by an erasing head having a head body made of permanent magnetic material having a slider plane to confront with recording medium which is subject to erase, a part of said slider plane to confront with a track to be erased being magnetized so that said slider plane has a plurality of magnetic poles, said slider plane confronting with recording medium with a width larger than that of a track to be erased, and magnetic metal film covering at least said slider plane of the head body.

BRIEF DESCRIPTION OF THE DRAWINGS

The foregoing and other objects, features, and attendant advantages of the present invention will be appreicated as the same become better understood by means of the following description and accompanying drawings wherein.

DESCRIPTION OF THE PREFERRED EMBODIMENTS

Figure 1:
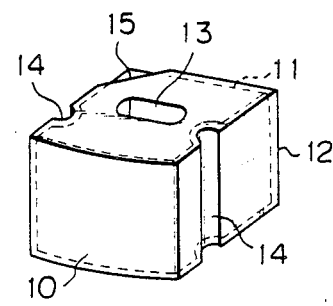
FIG. 1 is a perspective view of the erasing head according to the present invention.
Figure 2:
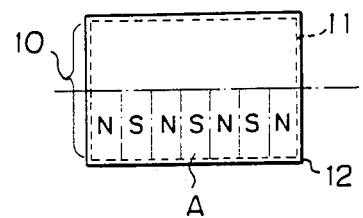
FIG. 2 is a plane view of the erasing head of FIG. 1.
Figure 3:
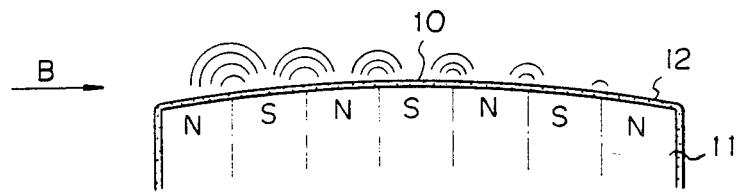
FIG. 3 is an enlarged cross-sectional view of FIG. 2.

In FIGS. 1 through 3, the present erasing head 11 has a slider plane 10 with the half width magnetized. In the embodiment of FIG. 2, the lower half portion A on the slider plane 10 is magnetized. The whole body of the erasing head is made of permanent magnetic material, like ferrite material, to provide a permanent magnet. The surface of the erasing head body 11 is covered with the magnetic metal film. Said film is made of nickel, cobalt, or any other magnetic material, and said film is produced through plating (electroplating, electroless plating, or the combination of the same), evaporation process, ion plating process, sputtering process, or metalizing process.

When the magnetic film 12 is provided through plating process, it is preferable that the whole surface of the erasing head body is covered with said film as shown in FIGS. 1 through 3 in view of the producing step. By plating the whole surface, the productivity of an erasing head is increased, and a small crack of a permanent magnet body is covered by the film When the magnetic film 12 is provided through an evaporation process, ion plating process, sputtering process or metalizing process, it is preferable that the film 12 is provided only on the slider plane.

The eraser portion A in FIGS. 2 and 3 is magnetized to N-pole and S-pole alternately so that the flux decreases along the running direction B of the magnetic medium which is subject to erasure.

The erasing head body 11 has a hole 13 for fixing the same on a board, a positioning groove 14 for locating the erasing head, and a recess 15 for indicating the magnetized portion. In the embodiment of FIGS. 1 and 2, the presence of the recess 15 on the upper portion of the head shows that the head is magnetized in the lower portion as shown in FIG. 2.

It should be appreciated that the slider plane 10 according to the present invention is quite smooth when it is processed through bright plating process, and no polishing process of the slider plane is requested. As no polishing process is necessary, the manufacturing process is simplified.

Figure 4:
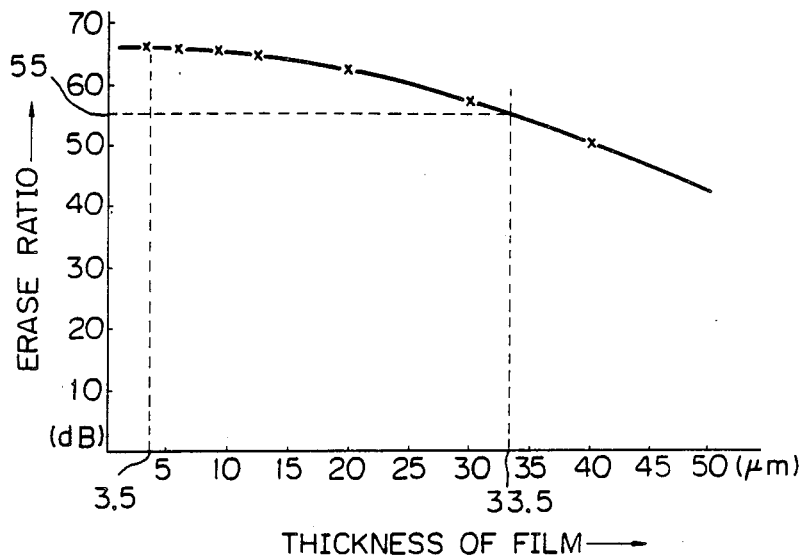
FIG. 4 shows the curves between thickness of magnetic film and the erase ratio in the present erasing head.

FIG. 4 shows the curve between the thickness of the magnetic film 12 and the erase ratio, where the magnetic film 12 is nickel film applied through an electroplating process. As the erase ratio is requested higher than 55 dB, the thickness of the film must be less than 33.5 $\mu$m, to provide the necessary erase ratio.

Figure 5:
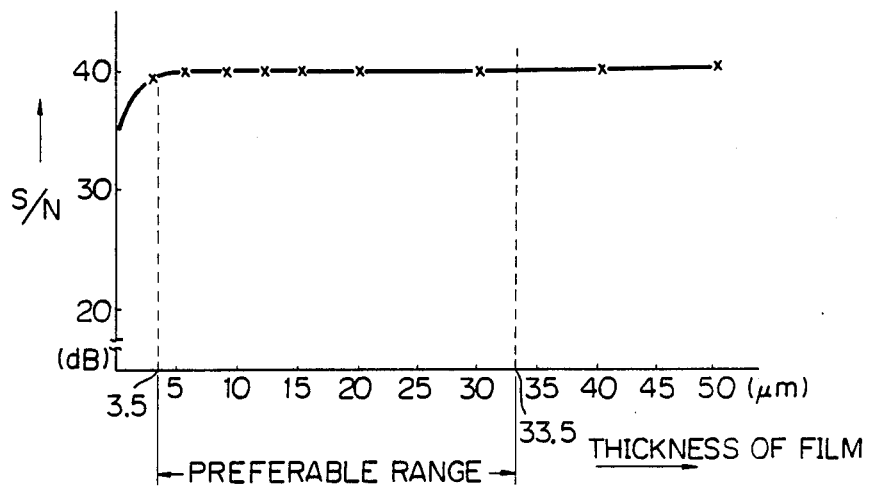
FIG. 5 shows curves between the thickness of magnetic film and S/N (signal to noise ratio) in the present erasing head.

FIG. 5 shows the curve between the thickness of the magnetic film 12 and the S/N ratio, where the magnetic film is nickel film applied through an electroplating process. As the necessary S/N ratio is generally 40 dB, the thickness of the film must be larger than 3.5 $\mu$m.

Accordingly, considering the experimental results of FIGS. 4 and 5, the thickness of the magnetic film must be in the range between 3.5 $\mu$m and 33.5 $\mu$m.

The operation of the magnetic film is as follows. The magnetic film 12 provides the magnetic path which short-circuits the undesired natural magnetic flux. Therefore, no flux by the natural flux affects a magnetic recording medium which is subject to erasure. Further since the thin magnetic film exists between a permanent magnet and a recording medium, the recording medium is less affected by the undesired natural magnetization on the slider plane. As the magnetic thin film 12 short-circuits the magnetic path of the natural flux, the thickness of the magnetic film may be less than that of non-magnetic film for getting rid of the affection by the natural flux.

Figure 6:
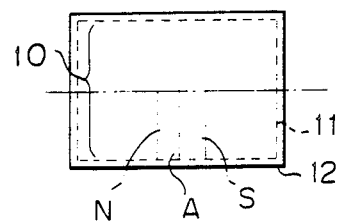
FIG. 6 is a vertical view of another embodiment of the present erasing head.
Figure 7:
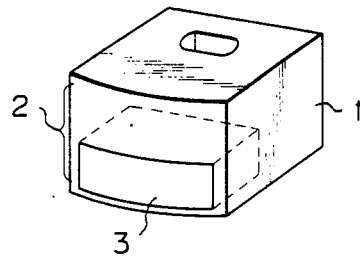
FIG. 7 is a perspective view of a prior erasing head.
Figure 8:
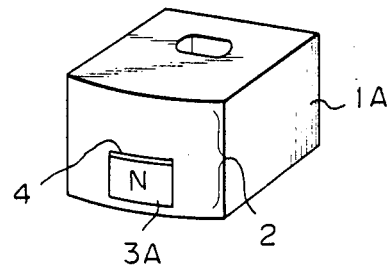
FIG. 8 is a perspective view of another prior erasing head.

The magnetization pattern of FIG. 2 or FIG. 3 on the slider plane is modified to a double pole pattern in FIG. 6, in which only a pair of N-pole and S-pole are provided along the running direction of a recording medium. When there are more than two magnetic poles, the leakage flux to the unerased track is decreased, and therefore, no shield member 4 of FIG. 8 is required.

The magnetic film may be provided either after the magnetization of the erasing head body, or before the magnetization of the erasing head body. Considering the productivity, it is preferable that the magnetic film is provided before the magnetization.

The recording medium which is subject to erasure is not restricted to magnetic tape, but other recording mediums, including magnetic discs, magnetic sheets, and/or magnetic cards, are also applicable to the present invention.

As mentioned above, according to the present invention, the problem by the undesired natural magnetization of a permanent magnet is solved, and the S/N ratio of a recording medium is improved. Further, the manufacturing process of the present erasing head is simplified as compared with that of a prior head, since no adherence process, nor polishing process are requested. Thus, the manufacturing cost of an erasing head is decreased. Further, as the magnetic film on the slider plane is conductive, said film may be grounded to prevent static electricity.

From the foregoing it will now be apparent that a new and improved erasing head has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An erasing head for erasing magnetic recording medium comprising:
   a head body made of a unitary one-piece non-laminated permanent magnetic material having a slider plane having a width, the slider plane facing with recording medium which is subject to erasure;
   a part of the width of said slider plane to confront with a track to be erased being magnetized so that said slider plane part has a plurality of magnetic poles and a part of the width of said slider plane being non-magnetized to confront with a portion of the recording medium beyond said track;
   said slider plane confronting with recording medium with width larger than that of said track; and
   a magnetic metal film covering at least said slider plane of the head body; wherein the thickness of said magnetic film is in the range between 3.5 $\mu$m and 33.5 $\mu$m.

2. An erasing head according to claim 1, wherein said magnetic film covers entire surface of the head body.

3. An erasing head according to claim 1, wherein said magnetic metal film is nickel film.

4. An erasing head according to claim 1, wherein said slider plane is magnetized so that flux decreases along relative running direction of recording medium.

5. An erasing head according to claim 1, wherein said slider plane has a pair of magnetic poles.

* * * * *